United States Patent
Lee et al.

(10) Patent No.: US 12,535,072 B2
(45) Date of Patent: Jan. 27, 2026

(54) RESIDUAL VOLTAGE CONTROLLER AND ELECTRIC COMPRESSOR INCLUDING THE SAME

(71) Applicant: Hanon Systems, Daejeon (KR)

(72) Inventors: Ho Jin Lee, Daejeon (KR); Eun Seok Kang, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 18/707,772

(22) PCT Filed: Dec. 19, 2022

(86) PCT No.: PCT/KR2022/020747
§ 371 (c)(1),
(2) Date: May 6, 2024

(87) PCT Pub. No.: WO2023/163349
PCT Pub. Date: Aug. 31, 2023

(65) Prior Publication Data
US 2025/0003409 A1    Jan. 2, 2025

(30) Foreign Application Priority Data
Feb. 24, 2022 (KR) .................. 10-2022-0024398

(51) Int. Cl.
*F04C 28/28* (2006.01)
*F04C 23/02* (2006.01)
(Continued)

(52) U.S. Cl.
CPC ........ *F04C 28/28* (2013.01); *F04C 2240/803* (2013.01); *F04C 2240/808* (2013.01); *F04C 2270/115* (2013.01); *F04C 2270/70* (2013.01)

(58) Field of Classification Search
CPC ...... F04C 18/0215; F04C 23/02; F04C 28/06; F04C 28/28; F04C 29/0085;
(Continued)

(56) References Cited

U.S. PATENT DOCUMENTS 11,530,858 B2 *  12/2022  Cools ................... F04C 28/08
12,040,680 B2 *   7/2024  Nigo .................... H02K 5/08
(Continued)

FOREIGN PATENT DOCUMENTS

JP    2020058123 A    4/2020
KR    20040042618 A    5/2004
(Continued)

OTHER PUBLICATIONS

Machine Translation KR 2004-0042618 (Year: 2025).*
Machine Translation KR 10 166 1765 (KR 2011 0137691) (Year: 2025).*

*Primary Examiner* — Dapinder Singh
(74) *Attorney, Agent, or Firm* — Shumaker, Loop & Kendrick, LLP; James D. Miller

(57) ABSTRACT

A residual voltage controller and an electric compressor including the same, which aim to prevent an electric shock or an accident caused by detachment of a high voltage connector through safe interruption of a residual voltage using a plurality of switching elements. The residual voltage controller includes a high voltage connector having an interlock, an inverter part configured to receive power from the high voltage connector, a motor part electrically connected to the inverter part to be controlled, and voltage controllers connected between the high voltage connector and the inverter part in each different direction to interrupt a residual voltage of the motor part when detachment of the high voltage connector is performed before a normal stop signal.

8 Claims, 4 Drawing Sheets

(51) Int. Cl.
  *F04C 28/06*    (2006.01)
  *F04C 29/00*    (2006.01)
  *H01R 13/70*    (2006.01)
  *H02H 5/00*     (2006.01)

(58) Field of Classification Search
  CPC .............. F04C 2240/30; F04C 2240/40; F04C 2240/403; F04C 2240/803; F04C 2240/808; F04C 2270/115; F04C 2270/70; H01R 13/70; H02H 5/00; H02K 11/40
  See application file for complete search history.

(56) References Cited

U.S. PATENT DOCUMENTS

2003/0098660 A1* 5/2003 Erdman ................. H02K 11/33
                                                       310/68 B
2006/0119302 A1* 6/2006 Yang ....................... H02P 29/02
                                                       318/434

FOREIGN PATENT DOCUMENTS

| KR | 101661765 B1  | 9/2016 |
| KR | 101935283 B1  | 1/2019 |
| KR | 20210098326 A | 8/2021 |

* cited by examiner

RESIDUAL VOLTAGE CONTROLLER AND ELECTRIC COMPRESSOR INCLUDING THE SAME

CROSS-REFERENCE TO RELATED APPLICATIONS

The present application is a U.S. National Stage of International Patent Application No: PCT/KR2022/020747 filed on Dec. 19, 2022 which claims priority to Korea Patent Application No. 10-2022-0024398, filed on Feb. 24, 2022, the entire contents of each of which are incorporated herein for all purposes by this reference.

TECHNICAL FIELD

The present embodiment relates to a safe interruption of a residual voltage according to detachment of a high voltage connector provided in an electric compressor, more particularly, to a residual voltage controller and an electric compressor including the same.

BACKGROUND ART

In general, an air-conditioning system for cooling or heating a passenger compartment is provided in a vehicle. Such an air-conditioning system includes a compressor configured to compress a gaseous refrigerant at a low temperature and a low pressure introduced from an evaporator into a gaseous refrigerant at a high temperature and a high pressure to be provided to a condenser.

The compressor applied in the vehicle may be classified into a mechanical compressor configured to be driven by a driving force received from an engine and an electric compressor configured to use a motor driven by electric power, and recently, use of the electric compressor is increasing as the electrification of the vehicle is accelerated.

Meanwhile, as an example of the compressor, there are a reciprocating compressor that compresses a refrigerant according to which pistons reciprocate, and a rotary compressor that compresses a refrigerant while rotating. The reciprocating compressor includes a crank compressor that transmits a driving force from a drive source to a plurality of pistons using a crank, a swash plate compressor that transmits a driving force from a drive source to a rotary shaft installed with a swash plate, and the like, according to the power transmission method from the drive source. The rotary compressor includes a vane rotary compressor that utilizes a rotating rotary shaft and vane, and a scroll compressor that utilizes an orbiting scroll and a fixed scroll.

In addition, development of a compressor of an inverter type capable of varying the operating speed of the motor has been actively conducted. In the electric compressor in the inverter type, an inverter is mounted on an outer circumferential surface or a side surface of a casing.

A high voltage connector is provided in the electric compressor to allow the electric compressor to be driven by a high voltage applied thereto.

The high voltage connector checks whether the high voltage connector is fastened using an interlock feature.

In particular, the electric compressor used in a vehicular air-conditioning system needs to limit power being used depending on a storage state of the electricity in the vehicle because the electric compressor operates with the electric energy stored in the vehicle. Therefore, if a situation requiring to limit use of the electricity takes place, the vehicular air-conditioning system decreases an RPM (revolutions per minute) instructed so as to limit the electricity used by the electric compressor.

According to the rules and regulations, when an accident of the electric vehicle occurs, or repair thereof is conducted, and detachment from a high voltage power occurs, the potential of the electric compressor must be 60V or less in 1 second.

In the related art, in order to meet such rules and regulations, by providing a resistance having a great capacity at a DC input end so as to discharge all the time, or by configuring a circuit with a reduced capacity of a capacitor at the DC link end, electric shocks and fire which may be caused after an accident may be prevented by interrupting a high-voltage system when a fault is occurred in an interlock circuit because of an accident.

However, when a power line is opened during a high speed operation, because of the characteristics of the inverter having an inductive load, a certain period of time is taken until the power level of the high-voltage line decreases, and the electric shock accident may occur due to the residual voltage while an operator checks the high voltage connector for the repair work and inspection, thereby requiring a measure thereto.

SUMMARY

The present embodiment aims to provide a residual voltage controller capable of facilitating stable inspection and repair work for an operator by safely preventing an electric shock accident by the residual voltage which may happen due to detachment of the high voltage connector, and an electric compressor including the same.

One embodiment is a residual voltage controller, including: a high voltage connector having an interlock; an inverter part configured to receive power from the high voltage connector; a motor part electrically connected to the inverter part to be controlled; and voltage controllers connected between the high voltage connector and the inverter part in each different direction to interrupt a residual voltage of the motor part when detachment of the high voltage connector is performed before a normal stop signal.

The voltage controller may include: a first voltage controller connected in series between the high voltage connector and the inverter part; and a second voltage controller connected in parallel between the high voltage connector and the inverter part.

The first voltage controller may be configured to preferentially interrupt a voltage applied to the inverter part when detachment of the high voltage connector is performed.

The second voltage controller may be configured to reduce a residual voltage of the motor part through discharge.

The first voltage controller may include: a first switching element configured to interrupt a residual voltage in a direction from the inverter part to the high voltage connector; and a second switching element disposed in a direction opposite to the first switching element and electrically connected to the first switching element.

The first switching element may further include: a first ground switch provided for an electric connection, and the second switching element may further include: a second ground switch provided for an electric connection.

The second voltage controller may include: a first switch configured to allow an electric coupling state to change over when detachment of the high voltage connector is performed; a third switching element electrically connected to the first switch; and a resistance part electrically connected to the third switching element, and configured to consume a voltage as heat generation is performed by an applied voltage when the first switch is changed over to an on-state.

The third switching element may further include: a third ground switch provided for an electric connection.

Another embodiment is an electric compressor, including: a housing; a motor part provided in the housing; a compression part configured to be driven by the motor part; an inverter part coupled to one side of the housing and configured to control operations of the motor part; a high voltage connector having an interlock; and voltage controllers connected between the high voltage connector and the inverter part in each different direction to interrupt a residual voltage of the motor part when detachment of the high voltage connector is performed before a normal stop signal.

The voltage controller may include: a first voltage controller connected in series between the high voltage connector and the inverter part; and a second voltage controller connected in parallel between the high voltage connector and the inverter part.

The first voltage controller may include: a first switching element configured to interrupt a residual voltage in a direction from the inverter part to the high voltage connector; and a second switching element disposed in a direction opposite to the first switching element and electrically connected to the first switching element.

The second voltage controller may include: a first switch configured to allow an electric coupling state to change over when detachment of the high voltage connector is performed; a third switching element electrically connected to the first switch; and a resistance part electrically connected to the third switching element, and configured to consume a voltage as heat generation is performed by an applied voltage when the first switch is changed over ton an on-state.

The embodiments of the present disclosure may improve safety by promptly interrupting the residual voltage when detachment of the high voltage connector of the electric compressor is performed.

The present embodiments may facilitate stable inspection and repair work by preventing an electric shock accident to the operator by the residual voltage when detachment of the high voltage connector is performed.

The present embodiments may improve the operational safety by realizing a stable electricity relay through an arrangement of first to second voltage controllers.

DETAILED DESCRIPTION

Figure 1:
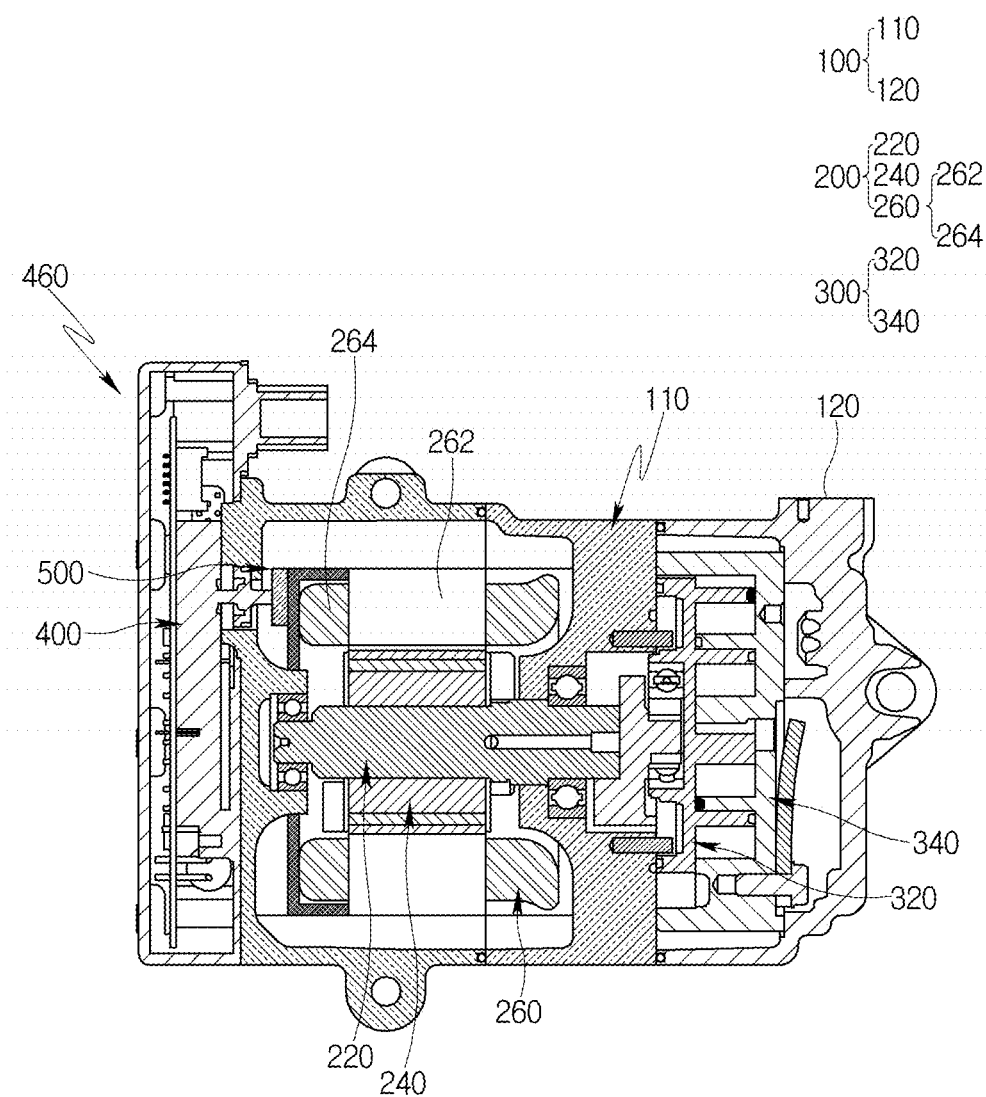
FIG. 1 is a cross-sectional view illustrating an electric compressor according to the present embodiment.

Advantages and characteristics of the present disclosure and a method of achieving the advantages and characteristics will be clear by referring to exemplary embodiments described below in detail together with the accompanying drawings. However, the present disclosure is not limited to exemplary embodiment disclosed herein but will be implemented in various forms. The exemplary embodiments are provided by way of example only so that a person of ordinary skilled in the art can fully understand the disclosures of the present disclosure and the scope of the present disclosure. Therefore, the present disclosure will be defined only by the scope of the appended claims. Like reference numerals generally denote like elements throughout the specification.

What one component is referred to as being "connected to" or "coupled to" another component includes both a case where one component is directly connected or coupled to another component and a case where a further another component is interposed between them. Meanwhile, what one component is referred to as being "directly connected to" or "directly coupled to" another component indicates that a further another component is not interposed between them. The term "and/or" includes each of the mentioned items and one or more all of combinations thereof.

Terms used in the present specification are provided for description of only specific embodiments of the present invention, and not intended to be limiting. In the present specification, an expression of a singular form includes the expression of plural form thereof if not specifically stated. The terms "comprises" and/or "comprising" used in the specification is intended to specify characteristics, numbers, steps, operations, components, parts or any combination thereof which are mentioned in the specification, and intended not to exclude the existence or addition of at least one another characteristics, numbers, steps, operations, components, parts or any combination thereof.

While terms such as the first and the second, etc., can be used to describe various components, the components are not limited by the terms mentioned above. The terms are used only for distinguishing between one component and other components.

Figure 2:
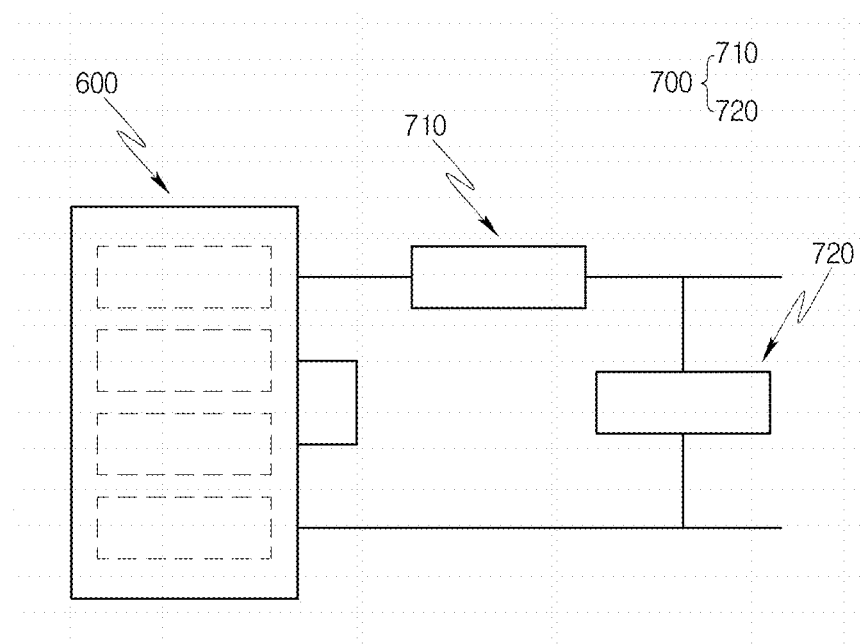
FIG. 2 is a circuit diagram simply illustrating an arrangement state of a residual voltage controller according to the present embodiment.
Figure 3:
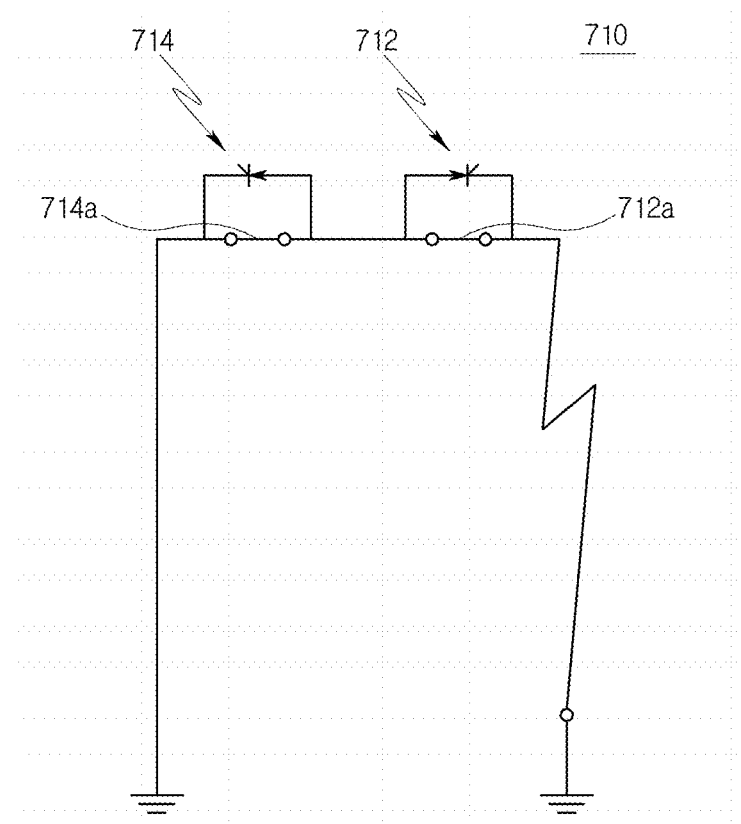
FIGS. 3 to 4 are views illustrating first and second voltage controllers when an electric compressor according to the present embodiment operates normally.
Figure 4:
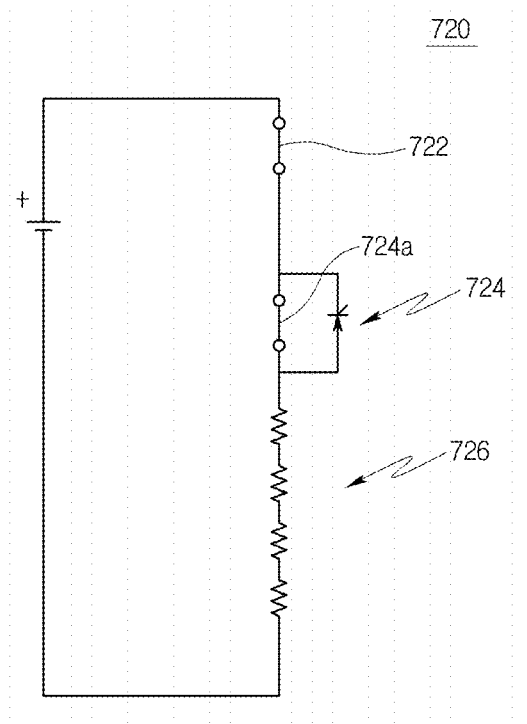
Figure 5:
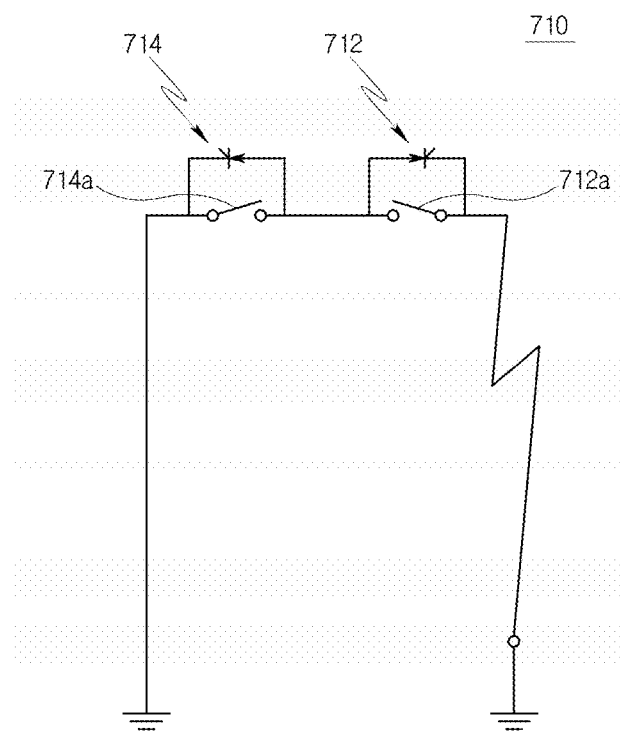
FIGS. 5 to 6 are views illustrating a state operated to interrupt a residual voltage after a high voltage connector provided in an electric compressor according to the present embodiment is detached.
Figure 6:
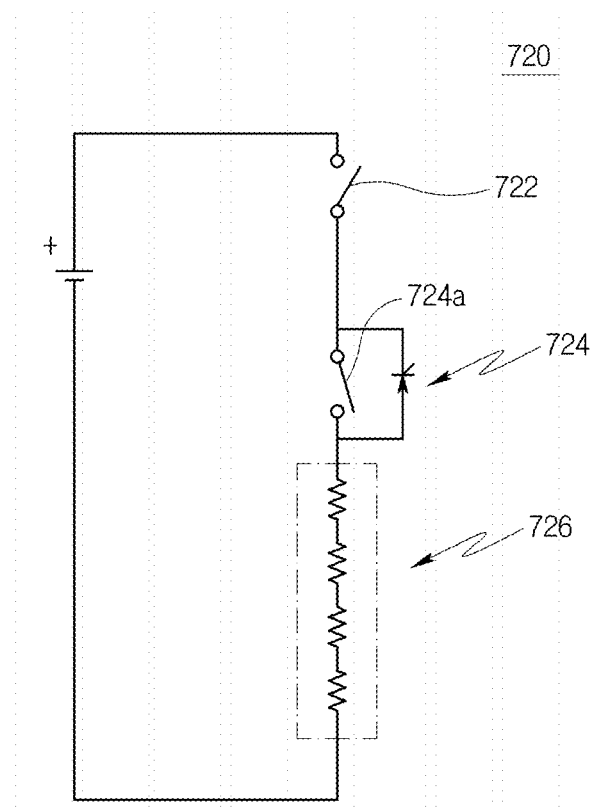

With reference to the accompanying drawings, a configuration of the electric compressor according to an embodiment of the present disclosure will be described. FIG. 1 is a cross-sectional view illustrating an electric compressor according to the present embodiment, FIG. 2 is a circuit diagram simply illustrating an arrangement state of a residual voltage controller according to the present embodiment, FIGS. 3 to 4 are views illustrating first and second voltage controllers when an electric compressor according to the present embodiment operates normally, and FIGS. 5 to 6 are views illustrating a state operated to interrupt a residual voltage after a high voltage connector provided in an electric compressor according to the present embodiment is detached.

Referring to FIGS. 1 to 6, the electric compressor according to the present embodiment includes a housing 100, a motor part 200, a compression part 300, and an inverter part 400.

In addition, the motor part 200 and the inverter part 400 are configured to be electrically operated through a terminal unit 500.

The housing 100 forms an overall appearance of the electric compressor, and consists of a front housing 110 and a rear housing 120 in the present embodiment.

The motor part 200 is provided in the front housing 110, and provides power for the compression part 200 to compress the refrigerant. The motor part 200 includes a rotor 240 coupled to a rotational axis 220 rotatably installed at a center of the front housing 110, and a stator 260 fixed to the front housing 110 and disposed on a radial outside of the rotor 240. The stator 260 includes a stator core 262, and a coil 264 wound on the stator core 262.

The compression part 300 is provided in the rear housing 120, and includes an orbiting scroll 320 coupled to the rotational axis 220 through an eccentric bush, and a fixed scroll 340 fixed between the front housing 110 and the rear housing 120 and forming a compression chamber in which compression of the refrigerant is performed together with the orbiting scroll 320.

As such, a rotational force generated in the motor part 200 may be provided to the orbiting scroll 320 of the compression part through the rotational axis 220 as the compression part 200 is connected to the motor part 200 through the rotational axis 220.

The inverter part 400 is provided on an outside of the housing 100, and coupled to a side opposite to the compression part 300 on the basis of the motor part 200. The inverter part 400 is electrically connected to the motor part 200, and applies power to the motor part 200 and controls operations through power provided from the outside and control signals.

More particularly, the stator 260 forms an electromagnetic field by power applied from the inverter part 400, and a rotational force for operating the compression part 300 is generated as the rotor 240 rotates by the electromagnetic field formed by the stator 260.

In the inverter part 400, a printed circuit board (not illustrated) on which switching elements (not illustrated) are provided is provided, and an inverter case 460 coupled to the housing 100 and configured to accommodate the printed circuit board is included.

The electric compressor facilitates stable cooling by controlling an RPM of the motor part 200 according to a required cooling amount depending on a temperature set by the operator through the inverter part 400.

The present embodiment aims to stably interrupt an electric circuit between the high voltage connector 600 and the inverter part 400 so that a voltage which is equal to or more than 60V does not continue in the high voltage connector 600 by a rotation of the motor part 200 when detachment of the high voltage connector 600 occurs in a state in which a fault is occurred in the interlock circuit of the motor part 200, or a stop command is not input into the electric compressor.

With this configuration, the present embodiment may facilitate stable inspection and repair work by preventing an electric shock accident of the operator by the residual voltage if detachment of the high voltage connector of the electric compressor is performed.

To this end, the present embodiment includes voltage controllers 700 connected between the high voltage connector 600 and the inverter part 400 in each different direction to interrupt a residual voltage of the motor part 200 when detachment of the high voltage connector 600 is performed before a normal stop signal.

The voltage controllers 700 include a first voltage controller 710 connected in series between the high voltage connector 600 and the inverter part 400, and a second voltage controller 720 connected in parallel between the high voltage connector 600 and the inverter part 400.

In particular, because the first voltage controller 710 is connected in series between the high voltage connector 600 and the inverter part 400 in the present embodiment, the present embodiment may separate the high voltage connector 600 and the inverter part 400 from each other in an electrically stable manner by promptly interrupting continuation of the voltage to the high voltage connector 600 due to the residual rotation of the motor part 200.

To this end, the first voltage controller 710 includes a first switching element 712 provided to interrupt the residual voltage in a direction from the inverter part 400 to the high voltage connector 600, and a second switching element 714 disposed on a direction opposite to an arrangement direction of the first switching element 712, and electrically connected to the first switching element 712.

In the first switching element 712, for example, an insulated gate bipolar transistor (IGBT) is used, and the insulated gate bipolar transistor is capable of high voltage switching, and may be used stably in the high voltage region.

In addition, a first ground switch 712a is provided in the first switching element 712 for electric connection, and a second ground switch 714a is provided in the second switching element 714 for electric connection.

When the electric compressor is normally operated, in the first and the second switching elements 712 and 714, the first and the second ground switches 712a and 714a are grounded in an on-state, and when the interlock is detached in a state in which a normal stop command is not input, the ground state changes over to an off-state, and a state illustrated in FIG. 5 is maintained.

When the interlock is detached from the high voltage connector 600, the first voltage controller 710 preferentially interrupt the voltage applied to the inverter part 400 so as to prevent an accident of the electric shock to the operator.

The first switching element 712 is disposed in a reverse direction, rather than a forward direction from the high voltage connector 600 to the inverter part 400, thereby stably interrupting the voltage.

In addition, the second switching element 714 is disposed in a forward direction from the high voltage connector 600 to the inverter part 400, and the voltage may be applied to the inverter part 400 by passing through the second switch element 714 if a ground state by the turning on of the first ground switch 712a is maintained during a normal operation of the electric compressor.

During a normal operation of the electric compressor, the voltage may be applied stably if a ground state by the turning on of the second ground switch 714a is maintained.

The present embodiment realizes switching circuits of the first switching element 712 and the second switching element 714, and the first and the second ground switches 712a and 714a are changed over to an off-state as soon as the detachment of the interlock, thereby interrupting the voltage because of the detachment of the high voltage connector 600.

According to the present embodiment, the motor part 200 is rotated at a certain RPM because of the interlock detachment of the high voltage connector 600, thereby the residual voltage is maintained. In this case, because the residual voltage may be discharged through the second voltage controller 720, the residual voltage may change over to 0V after a certain time elapses.

The second voltage controller 720 includes a first switch 722 of which the electrical coupling state is changed over if detachment of the high voltage connector is performed, a third switch 724 electrically connected to the first switch 722, and a resistance part 726 electrically connected to the third switching element 724 and configured to consume a voltage as heat generation is performed by an applied voltage when the first switch 722 is changed over to an on-state.

In addition, in the third switching element 724, a third ground switch 724a is provided for an electric connection, and therefore, an electric connection or disconnection may be performed.

The first switch 722 is operated to be in an on-state during the normal operation of the electric compressor (refer to FIG. 4), and is changed over to an off-state due to disconnection when the interlock is detached (refer to FIG. 6).

The third switching element 724 may apply the voltage to the inverter part 400 or apply the voltage in the reverse direction depending on the ground state according to turning on or off of the third ground switch 724a.

Since the resistance part 726 is formed with a plurality of individual resistances connected in series, the resistance part 726 serves to reduce the residual voltage of the motor part 200 through discharge by means of heat generation of the resistance when the interlock is detached.

The resistance part 726 may be configured that the individual resistances to have the same resistance value or different resistance values, and to be capable of generating heat stably by the residual voltage.

Therefore, in case the high voltage connector 600 is detached, a stable inspection by the operator may be facilitated by interrupting the voltage.

Although preferred embodiments of the present invention have been disclosed for illustrative purposes, those skilled in the art will appreciate that diverse variations and modifications are possible through addition, alteration, deletion, etc. of elements, without departing from the spirit and scope of the invention. In addition, such variations or modifications are intended to be included in the scope of the present invention.

The present embodiments may be installed in the electric compressor having the high voltage connector to facilitate stable use and inspection.

The invention claimed is:

1. A residual voltage controller, comprising:
a high voltage connector having an interlock;
an inverter part configured to receive power from the high voltage connector;
a motor part electrically connected to the inverter part to be controlled; and
voltage controllers connected between the high voltage connector and the inverter part in each different direction to interrupt a residual voltage of the motor part when detachment of the high voltage connector is performed before a normal stop signal,
wherein the voltage controllers comprise:
a first voltage controller connected in series between the high voltage connector and the inverter part; and
a second voltage controller connected in parallel between the high voltage connector and the inverter part,
wherein the first voltage controller comprises:
a first switching element configured to interrupt a residual voltage in a direction from the inverter part to the high voltage connector; and
a second switching element disposed in a direction opposite to the first switching element and electrically connected to the first switching element.

2. The residual voltage controller of claim 1, wherein the first voltage controller is configured to preferentially interrupt a voltage applied to the inverter part when detachment of the high voltage connector is performed.

3. The residual voltage controller of claim 1, wherein the second voltage controller is configured to reduce the residual voltage of the motor part through discharge.

4. The residual voltage controller of claim 1, wherein the first switching element comprises: a first ground switch provided for an electric connection, and wherein the second switching element comprises: a second ground switch provided for an electric connection.

5. A residual voltage controller, comprising:
a high voltage connector having an interlock;
an inverter part configured to receive power from the high voltage connector;
a motor part electrically connected to the inverter part to be controlled; and
voltage controllers connected between the high voltage connector and the inverter part in each different direction to interrupt a residual voltage of the motor part when detachment of the high voltage connector is performed before a normal stop signal,
wherein the voltage controllers comprise:
a first voltage controller connected in series between the high voltage connector and the inverter part; and
a second voltage controller connected in parallel between the high voltage connector and the inverter part,
wherein the second voltage controller comprises:
a first switch configured to allow an electric coupling state to change over when detachment of the high voltage connector is performed;
a switching element electrically connected to the first switch; and
a resistance part electrically connected to the switching element, and configured to consume a voltage as heat generation is performed by an applied voltage when the first switch is changed over to an on-state.

6. The residual voltage controller of claim 5, wherein the switching element comprises: a ground switch provided for an electric connection.

7. An electric compressor, comprising:
a housing;
a motor part provided in the housing;
a compression part configured to be driven by the motor part;
an inverter part coupled to one side of the housing and configured to control operations of the motor part;
a high voltage connector having an interlock; and
voltage controllers connected between the high voltage connector and the inverter part in each different direction to interrupt a residual voltage of the motor part when detachment of the high voltage connector is performed before a normal stop signal,
wherein the voltage controllers comprise:
a first voltage controller connected in series between the high voltage connector and the inverter part; and
a second voltage controller connected in parallel between the high voltage connector and the inverter part,
wherein the first voltage controller comprises:
a first switching element configured to interrupt a residual voltage in a direction from the inverter part to the high voltage connector; and
a second switching element disposed in a direction opposite to the first switching element and electrically connected to the first switching element.

8. An electric compressor, comprising:
a housing;
a motor part provided in the housing;
a compression part configured to be driven by the motor part;

an inverter part coupled to one side of the housing and configured to control operations of the motor part;

a high voltage connector having an interlock; and voltage controllers connected between the high voltage connector and the inverter part in each different direction to interrupt a residual voltage of the motor part when detachment of the high voltage connector is performed before a normal stop signal, wherein the voltage controllers comprise:
- a first voltage controller connected in series between the high voltage connector and the inverter part; and
- a second voltage controller connected in parallel between the high voltage connector and the inverter part, wherein the second voltage controller comprises:
- a first switch configured to allow an electric coupling state to change over when detachment of the high voltage connector is performed;
- a switching element electrically connected to the first switch; and
- a resistance part electrically connected to the switching element, and configured to consume a voltage as heat generation is performed by an applied voltage when the first switch is changed over to an on-state.

* * * * *